United States Patent

[11] 3,549,168

| [72] | Inventor | Allan R. Swanson |
| | | St. Joseph, Mich. |
| [21] | Appl. No. | 758,324 |
| [22] | Filed | Sept. 9, 1968 |
| [45] | Patented | Dec. 22, 1970 |
| [73] | Assignee | Clark Equipment Company |
| | | a corporation of Delaware |

[54] SUSPENSION SYSTEM FOR A VEHICLE
10 Claims, 4 Drawing Figs.

[52] U.S. Cl. .................................................. 280/124,
280/6.11; 267/64
[51] Int. Cl. .................................................. B60g 11/26
[50] Field of Search .......................................... 280/122F,
6, 6.11, 6H; 267/64, 65

[56] References Cited
UNITED STATES PATENTS
3,226,103  12/1965  McNenny ..................... 267/64
FOREIGN PATENTS
649,679  10/1962  Canada ........................ 280/6.11

*Primary Examiner*—Philip Goodman
*Attorneys*—Kenneth C. Witt, John C. Wiessler, Robert H. Johnson and Reginald J. Falkowski ABSTRACT: A vehicle with a fluid suspension system that maintains a substantially constant height regardless of vehicle load and dampens oscillations in the suspension system.

INVENTOR
ALLAN R. SWANSON
BY Robert H. Johnson
ATTORNEY

INVENTOR
ALLAN R. SWANSON
BY *Robert H. Johnson*
ATTORNEY

SUSPENSION SYSTEM FOR A VEHICLE

BACKGROUND OF THE INVENTION

The field of art to which the invention pertains includes suspension systems, and more specifically fluid suspension systems.

Tractor scrapers are used in many construction applications, roadbuilding probably being the most common application, to transport heavy loads of material such as dirt, shot rock, gravel and the like over rough roads from one location to another in conjunction with whatever construction is being carried on, and also for loading, spreading and grading of such material. Consequently, the total amplitude of travel of the drive axle of the scraper has to be limited so that the operator's control of the scraper cutting edge for loading, spreading and grading will not be adversely influenced. Further, good riding properties must be provided for the scraper, whether loaded or unloaded, within the acceptable amplitude of travel of the drive axle.

A principal object of my invention is to provide an improved suspension system which provides a good ride, whether the vehicle is loaded or unloaded, within the acceptable amplitude of travel of the drive axle.

SUMMARY OF THE INVENTION

In carrying out my invention in a preferred embodiment, I provide a pump connected in circuit to a variable length fluid support and an accumulator. The support also is connected in circuit with a reservoir. The circuit between the support and reservoir includes a first fluid flow restriction and a second fluid flow restriction which is variable in response to a change in the length of the support.

The above and other objects, features and advantages of my invention will be more readily understood by persons skilled in the art when the following detailed description is taken in conjunction with the drawing.

DESCRIPTION OF THE PREFERRED EMBODIMENT

Figure 1:
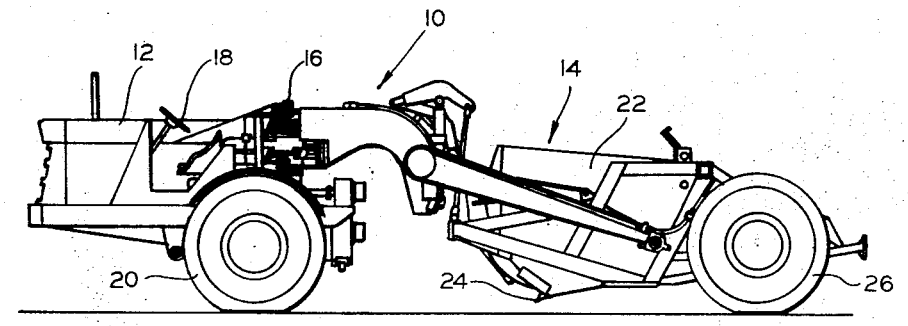
FIG. 1 is a side elevation of a tractor scraper embodying my invention.
Figure 2:
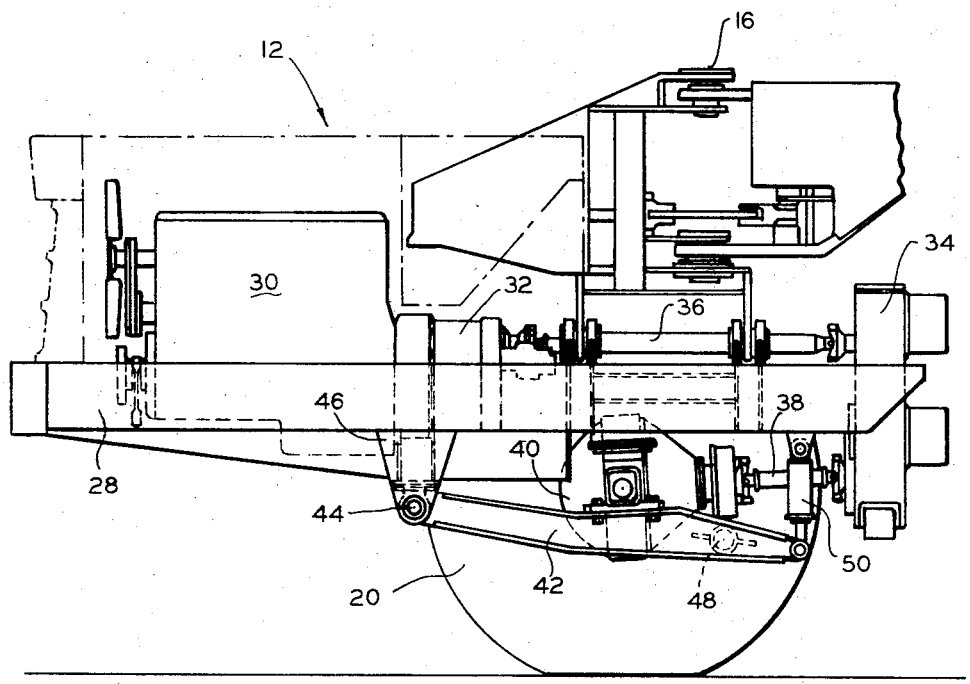
FIG. 2 is a side elevation of an enlarged scale of the tractor portion of the vehicle of FIG. 1 and shows in more detail a portion of the suspension system.

Referring now to FIGS. 1 and 2, the reference numeral 10 denotes generally a tractor scraper having a tractor portion 12 connected to a scraper portion 14 for pivotal movement about a vertical axis at 16. Tractor portion 12 includes an operator's station 18 and is supported by a pair of drive wheels or ground-engaging means 20. Scraper portion 14 includes a bowl 22 in which material is carried, a blade 24 which can be used to direct dirt, for example, into bowl 22 and a pair of rear support wheels or ground-engaging means 26.

Referring now more specifically to FIG. 2, it will be seen that tractor portion 12 includes a frame 28 which carries a suitable prime mover 30, such as a diesel engine, to which a hydrodynamic torque converter 32 is connected. Torque converter 32 in turn is connected to a change-speed gear transmission 34 by means of a drive shaft 36. Transmission 34 is connected by means of a shaft 38 to a drive axle 40 through which power is transmitted to the wheels 20 mounted for rotation at each end thereof. Axle 40 is fixed to a pair of laterally spaced-apart trailing arms 42 (only one of which is shown) intermediate the ends of arms 42. Each arm 42 is pivotally connected at 44 to a separate downwardly extending bracket 46 which is connected to frame 28. Also, trailing arms 42 are connected by means of a torsion bar 48 which extends between them. Pivotally connected between the ends of trailing arms 42 remote from pivot connection 44 and frame 28 is a pair of variable length fluid supports 50 and 52 (see FIG. 3).

Figure 3:
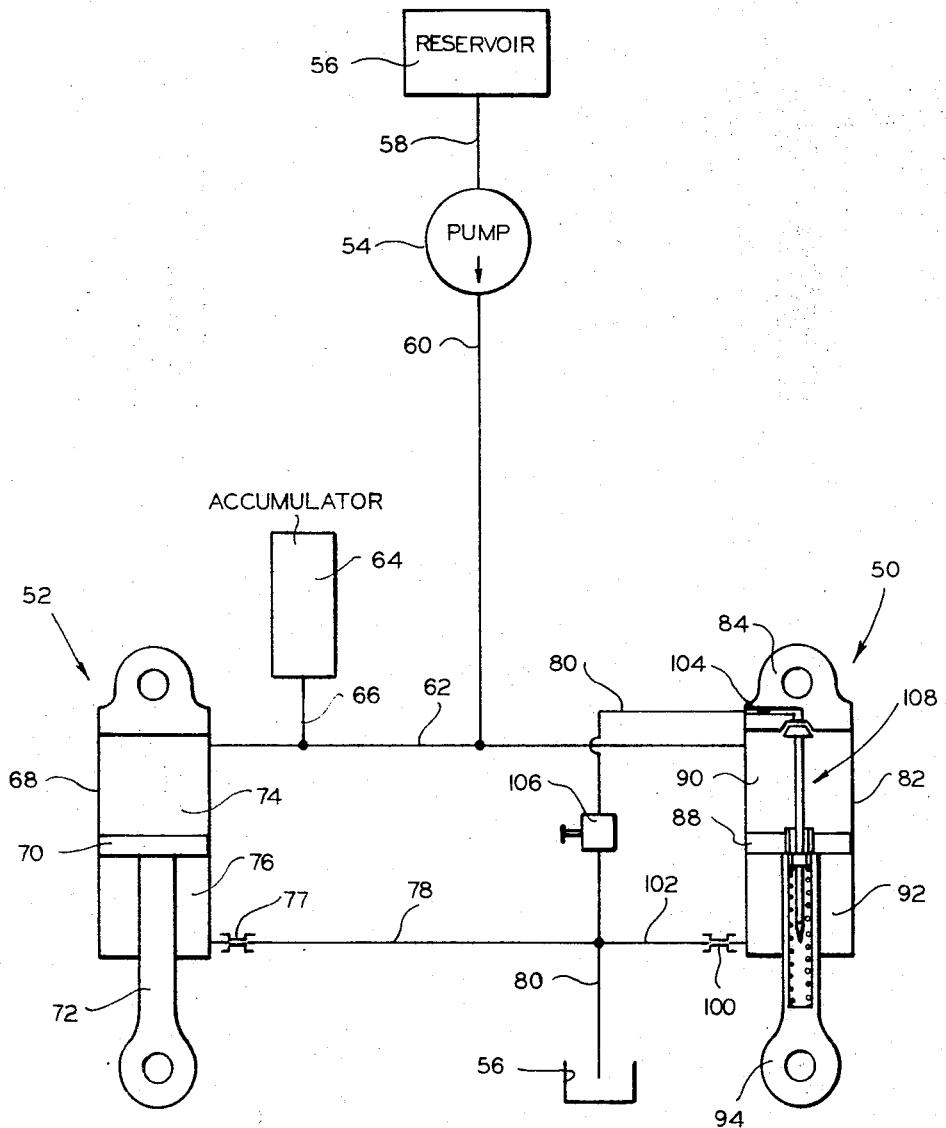
FIG. 3 is a schematic diagram of the fluid circuitry of my invention.
Figure 4:
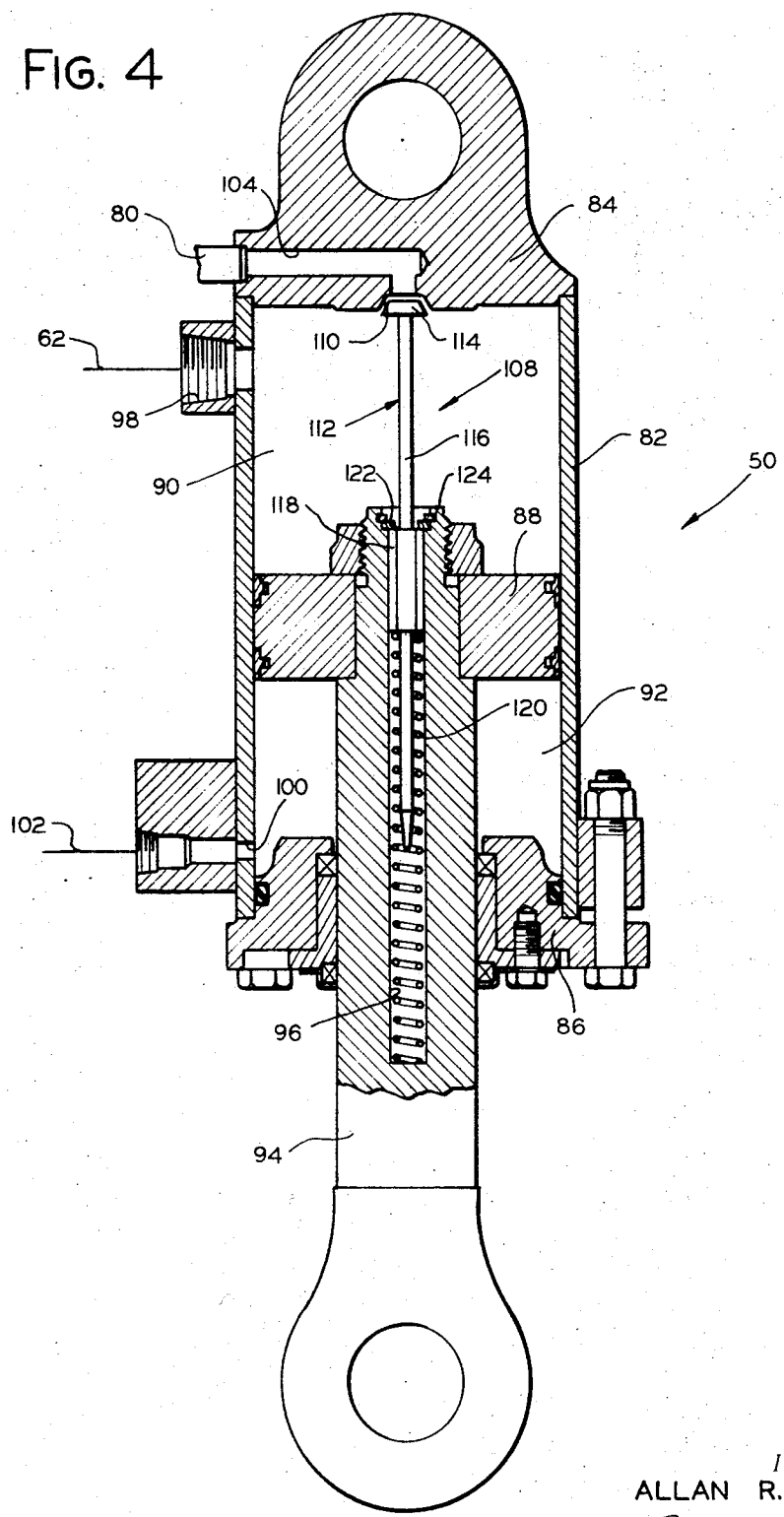
FIG. 4 is a cross section of a combined variable length fluid support and fluid flow restriction valve.

Tractor scraper 10 and the portion of the suspension system which has been described thus far is conventional. Turning now to FIGS. 3 and 4 the portion of the suspension system which embodies my invention will now be described. A pump 54 draws fluid from a reservoir 56 via conduit 58 and supplies pressurized fluid to supports 50 and 52 via a conduit 60 and a branch conduit 62. Connected in circuit between pump 54 and supports 50 and 52 is a conventional fluid accumulator 64 which is connected by means of a conduit 66 to branch conduit 62. Accumulator 64 simply functions as a fluid spring as is usual in fluid suspensions.

At this point it is necessary to describe in some detail supports 50 and 52. Support 52 includes a cylinder 68 which is closed at each end, a piston 70 slidably disposed in cylinder 68 and a piston rod 72 connected to piston 70 and which extends through one end of cylinder 68. Piston 70 divides cylinder 68 into a pair of chambers 74 and 76. Chamber 74 is in communication with pump 54 and accumulator 64 via branch conduit 62. Chamber 76 is connected to reservoir 56 by means of a fluid flow restriction 77, a conduit 78 and a conduit 80. Support 50 includes a cylinder 82 having a pair of ends 84 an and 86. Slidably disposed in cylinder 82 is a piston 88 which divides cylinder 82 into a pair of chambers 90 and 92. Fixed to piston 88 is a piston rod 94 which includes a longitudinally extending bore 96, the purpose of which will be explained shortly. Chamber 90 is in fluid communication with pump 54 and accumulator 64 through a port 98 to which branch conduit 62 is connected. Chamber 92 is in fluid communication with reservoir 56 via a fluid flow restriction 100 and a conduit 102 which connects to conduit 80. Support 50 also includes a fluid passage 104 located in end 84.

Combined with support 50 is a valve 108 which functions as a variable fluid flow restriction. Valve 108 includes a seat 110 and a cooperating closure member 112. Seat 110 is disposed in end 84 and communicates with fluid passage 104. Closure member 112 includes a head 114 which seals against seat 110 and integral therewith a stem 116 which is telescoped in bore 96. Stem 116 includes an enlarged diameter portion 118 which slidably engages bore 96. A compression spring 120 is located in bore 96 between enlarged portion 118 and the bottom of the bore and biases closure member 112 outwardly of bore 96 toward seat 110. Outward movement of closure member 112 is limited by engagement of enlarged portion 118 with a stop 120 which is held in place in bore 96 by means of a snap ring 124.

Connected to passage 104 is conduit 80 with which conduits 78 and 102 communicate. Disposed in conduit 80 between the junction with conduits 78 and 102 and fluid passage 104 is an adjustable fluid flow restriction 106 which serves to control the rate of fluid flow out of chamber 90 when supports 50 and 52 are extending and valve 108 is not restricting fluid flow so that the rate of fluid flow out of accumulator 64 does not become excessive and result in damage to it.

In order to enable persons skilled in the art to better understand my invention I will now explain the operation of it. It will be assumed that prime mover 30 is operating so that pump 54 which is driven by it is pumping fluid. Initially, valve 108 is closed so that accumulator 64 will expand until the pressure being generated by pump 54 is high enough to provide sufficient force to overcome the loading of tractor scraper 10 so that supports 50 and 52 will start to extend and chambers 74 and 90 will start to expand. Supports 50 and 52 will continue to extend until valve 108 opens. The system will then be substantially in the position shown in FIG. 3. When valve 108 opens it permits the entire flow of pump 54, which is approximately 10 gallons per minute, to pass through chamber 90 and then back to reservoir 56. At this point it will be seen that valve 108 will now be functioning as a fluid flow restriction, and thus provide a fluid back pressure in chambers 74 and 90 which supplies a sufficient force to offset the loading of tractor scraper 10. If the load on tractor scraper 10 is increased it will cause supports 50 and 52 to collapse, thereby closing valve 108. Pump 54 will continue to pump fluid with the result that the pressure in the system will increase to a point where the increased loading of tractor scraper 10 is again offset and valve 108 opens. On the other hand, if the loading of tractor scraper 10 is lightened, supports 50 and 52 will tend to extend with the result that valve 108 is opened further, thereby causing a pressure drop in chambers 74 and 90. The pressure in chambers 74 and 90 will continue to drop until a pressure is reached which provides a force which offsets the new lighter loading of tractor scraper 10. The new lower pressure will now be maintained by valve 108. It should be noted that regardless of the pressure at which the system stabilizes that once the system is stabilized that the entire output of pump 54 flows through chamber 92 and back to reservoir 56. Further, it will now be appreciated that regardless of the load on tractor scraper 10 that the scraper will be maintained substantially at the same height.

Now it will be assumed that the suspension system encounters a shock which causes supports 50 and 52 to collapse. Initial upward movement of support 50 causes valve 108 to close so that then fluid from chambers 74 and 90 is forced into accumulator 64, causing it to expand. In expanding, accumulator 64 acts as a spring and stops collapsing movement of supports 50 and 52, and then because of the energy stored therein causes them to expand and return to the normal stabilized position shown in FIG. 3. During collapse of supports 50 and 52 it will be remembered that pump 54 is still supplying fluid. However, the rate of flow of pump 54, as noted above, is only about 10 gallons per minute and the rate of flow of fluid out of chambers 74 and 90 into accumulator 64 is in excess of several hundred gallons per minute so that the pump flow is insignificant.

It will now be assumed that the tractor scraper 10 bounces so that supports 50 and 52 start to extend since the load upon them is decreased. Initial extension of support 50 causes valve 108 to open completely so that it no longer offers any restriction to fluid flow from chamber 90 out through fluid passage 104. At this point the function of adjustable flow restriction 106 will become apparent. With the restriction to fluid flow offered by valve 108 completely removed, accumulator 64 would rapidly bottom, with probable damage to it, except for the restriction to fluid flow provided by restriction 106. Again, we are dealing with a fluid flow from accumulator 64 in excess of several hundred gallons per minute so that pump flow is insignificant. Also, as supports 50 and 52 extend due to vehicle bounce their extension is dampened due to the dash pot action of fluid being forced out of chambers 76 and 92 past restrictions 77 and 100 to reservoir 56.

While only a single preferred embodiment of my invention has been disclosed, it will be understood that this is done for purposes of illustration only and that my invention is subject to various modifications and changes without departing from the spirit and scope of the claims. For example, the number of variable length supports is not limited to two. One or more supports could be used, depending upon the particular requirements of the suspension system. Consequently, the limits of my invention should be determined from the attached claims.

I claim:

1. For use with a vehicle having a frame and ground-engaging means, a suspension system comprising at least one variable length fluid support mounted between the frame and the ground-engaging means, a fluid pump directly connected to the said support for continuously supplying pressurized fluid thereto, a fluid accumulator connected in circuit between the said pump and support, a fluid reservoir connected in circuit to the said support, means responsive to changes in vehicle loading for maintaining a generally constant length of the said support, and a first fluid flow restriction connected in circuit between the said support and reservoir.

2. A system as set forth in claim 1 wherein the said me maintaining means is a second fluid flow restriction connected in series circuit with the said first restriction.

3. A system as set forth in claim 2 wherein the said second restriction is variable in response to a change in length of the said support.

4. A system as set forth in claim 3 wherein the said second restriction is located in series circuit between the said support and first restriction and the said first restriction is adjustable.

5. A system as set forth in claim 1 wherein the said support includes a cylinder and a piston slidably disposed in the said cylinder and the said maintaining means includes a second fluid flow restriction which is variable in response to a change in the location of the said piston in the said cylinder.

6. A system as set forth in claim 5 wherein the said second restriction is a valve connected in series circuit with the said first restriction, the said valve having a seat in one end of the said cylinder and a closure member connected to the said piston, the said closure member cooperating with the said seat to vary to the valve opening.

7. A system as set forth in claim 6 wherein the said closure member is connected to the said piston for reciprocal rectilinear movement between a first position adjacent the said piston and a second position remote from the said piston and including means for resiliently biasing the said closure member to the said second position.

8. A system as set forth in claim 7 wherein the the said piston divides the said cylinder into first and second chambers and the said valve connects the said first chamber with the said first restriction, and including a third fluid flow restriction connecting the said reservoir and second chamber.

9. A system as set forth in claim 1 wherein the said support includes a cylinder and a piston slidably disposed in the said cylinder, the said piston dividing the said cylinder into first and second chambers, the said maintaining means includes a second fluid flow restriction connecting the said first chamber and first restriction, and including a third fluid flow restriction connecting the said reservoir and second chamber.

10. Apparatus comprising a cylinder, the said cylinder having an end, a piston slidably disposed in the said cylinder and defining with the said cylinder and end a chamber, first and second fluid passages communicating separately with the said chamber, and a valve for restricting fluid flow from the said chamber out through one of the said passages, the said valve including a seat located in the said end, a closure member connected to the said piston for reciprocal rectilinear movement between a first position adjacent the said piston and a second position remote from the said piston, and means for resiliently biasing the said closure member to the said second position, the said closure member cooperating with the said seat to vary the valve opening.